United States Patent
Grunnet et al.

(10) Patent No.: US 11,674,500 B2
(45) Date of Patent: Jun. 13, 2023

(54) METHOD FOR CONTROLLING A WIND ENERGY FARM TAKING WAKE EFFECTS INTO ACCOUNT

(71) Applicant: VESTAS WIND SYSTEMS A/S, Aarhus N (DK)

(72) Inventors: Jacob Deleuran Grunnet, Tranbjerg J (DK); Anders Steen Nielsen, Højbjerg (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 118 days.

(21) Appl. No.: 16/961,111

(22) PCT Filed: Jan. 8, 2019

(86) PCT No.: PCT/DK2019/050005
§ 371 (c)(1),
(2) Date: Jul. 9, 2020

(87) PCT Pub. No.: WO2019/137590
PCT Pub. Date: Jul. 18, 2019

(65) Prior Publication Data
US 2021/0054826 A1 Feb. 25, 2021

(30) Foreign Application Priority Data

Jan. 9, 2018 (DK) .......................... PA 2018 70011

(51) Int. Cl.
*F03D 9/00* (2016.01)
*H02P 9/04* (2006.01)
(Continued)

(52) U.S. Cl.
CPC ........... *F03D 17/00* (2016.05); *F03D 7/0292* (2013.01); *F03D 7/048* (2013.01);
(Continued)

(58) Field of Classification Search
CPC ........ F03D 17/00; F03D 7/0292; F03D 7/048; F05B 2260/80; F05B 2270/1095; F05B 2270/331; F05B 2270/332
See application file for complete search history.

(56) References Cited

U.S. PATENT DOCUMENTS 7,569,945 B2 * 8/2009 Pedersen ............... F03D 7/0292
290/44
8,096,762 B2 * 1/2012 Risager .................. F03D 80/70
416/37
(Continued)

FOREIGN PATENT DOCUMENTS

EP 170851 A1 2/1986
EP 1790851 A1 5/2007
(Continued)

OTHER PUBLICATIONS

PCT Notification of Transmittal of the International Search Report and the Written Opinion of the International Searcihng Authority, or the Declaration for Application PCT/DK2019050005 dated Mar. 27, 2019.
(Continued)

*Primary Examiner* — Tulsidas C Patel
*Assistant Examiner* — Thomas K Quigley
(74) *Attorney, Agent, or Firm* — Patterson + Sherdan, LLP

(57) ABSTRACT

A method for controlling a wind energy farm is disclosed. A wake state of the wind energy farm is determined, including determining wake chains defining wake relationships among the wind turbines of the wind farm under the current wind conditions. For at least one of the wind turbines of the wind energy farm, a lifetime usage is estimated, based on an accumulated load measure for the wind turbine. In the case that the estimated lifetime usage is below a predefined lifetime usage limit, the wind turbine is operated in an
(Continued)

overrated state, while monitoring wake effects at each of the wind turbines. In the case that a downstream wind turbine detects wake effects above a predefined wake threshold level, at least one wind turbine having an upstream wake relationship with the downstream wind turbine is requested to decrease the generated wake, e.g. by decreasing power production.

17 Claims, 5 Drawing Sheets

(51) Int. Cl.
　　*F03D 17/00*　　(2016.01)
　　*F03D 7/02*　　(2006.01)
　　*F03D 7/04*　　(2006.01)
(52) U.S. Cl.
　　CPC ... *F05B 2260/80* (2013.01); *F05B 2270/1033* (2013.01); *F05B 2270/1095* (2013.01); *F05B 2270/331* (2013.01); *F05B 2270/332* (2013.01)

(56) References Cited

U.S. PATENT DOCUMENTS

| | | | | |
|---|---|---|---|---|
| 8,712,593 | B2* | 4/2014 | Bjertrup | F03D 7/046 290/55 |
| 2011/0115224 | A1* | 5/2011 | Lausen | F03D 7/024 290/44 |
| 2011/0142619 | A1 | 6/2011 | Subramanian et al. | |
| 2012/0133138 | A1 | 5/2012 | Sorensen et al. | |
| 2013/0140819 | A1* | 6/2013 | Abdallah | F03D 7/0224 290/44 |
| 2013/0166082 | A1 | 6/2013 | Ambekar et al. | |
| 2015/0308416 | A1* | 10/2015 | Ambekar | F03D 7/048 700/287 |
| 2018/0187649 | A1* | 7/2018 | Spruce | F03D 9/257 |

FOREIGN PATENT DOCUMENTS

| | | |
|---|---|---|
| EP | 2557311 A1 | 2/2013 |
| EP | 2644889 A1 | 10/2013 |
| EP | 2664889 A1 | 11/2013 |
| WO | 2011160634 A1 | 12/2011 |
| WO | 2013044925 A1 | 4/2013 |
| WO | 2017000950 | 1/2017 |
| WO | 2017000957 A1 | 1/2017 |
| WO | 2019137590 | 7/2019 |

OTHER PUBLICATIONS

Danish Patent and Trademark Office for Application No. PA 2018 70011 dated 9, 2018.

* cited by examiner

METHOD FOR CONTROLLING A WIND ENERGY FARM TAKING WAKE EFFECTS INTO ACCOUNT

FIELD OF THE INVENTION

The present invention relates to a method for controlling a wind energy farm in which overrating of the wind turbines of the wind energy farm is allowed with due consideration to the wake effects thereby created.

BACKGROUND OF THE INVENTION

Wind turbines are normally designed to produce a specific power level when the wind speed is above a certain wind speed which is sometimes referred to as the nominal wind speed of the wind turbine. This specific power level is sometimes referred to as the nominal power of the wind turbine.

In some cases the wind turbine may be allowed to produce power at a higher power level than the nominal power. This is sometimes referred to as the wind turbine being operated in an overrated state. The nominal power is normally selected in such a manner that design loads of the wind turbine are not exceeded, and in such a manner that accumulated fatigue loads do not exceed a limit which reduces the expected lifetime of the wind turbine. Therefore, a wind turbine is normally only operated in an overrated state for limited time periods.

When wind turbines are arranged in a wind energy farm, the wind turbines of the wind energy farm are positioned close to each other. Thereby some of the wind turbines may be arranged in the wake of one or more of the other wind turbines. The wind turbines arranged in the wake of one or more of the other wind turbines will receive wind with a smaller potential for extracting energy, because the upstream wind turbines have already extracted some of the energy from the wind. Furthermore, the upstream wind turbines may create turbulence which may in turn give rise to loads on the wind turbines arranged in the wake. This is undesirable, and therefore upstream wind turbines are sometimes derated, i.e. operated with a lower power production than the nominal power, in order to reduce wake effects for the downstream wind turbines.

WO 2011/160634 A1 discloses a wind park comprising a plurality of wind turbines. A downstream wind turbine includes a Lidar or other device for sensing characteristics of the wake produced by an upstream wind turbine and provides an output to a turbine or wind park controller indicative of the measured wake. The controller controls parameters of the downstream turbine in accordance with the wake indicative signals. The control may include overrating the downstream turbine if the wake indicative signal indicates that there is a low risk of fatigue damage to components of the downstream wind turbine.

DESCRIPTION OF THE INVENTION

It is an object of embodiments of the invention to provide a method for controlling a wind energy farm in which total power production of the wind energy farm is maximized without risking undesired wake effects.

The invention provides a method for controlling a wind energy farm, the wind energy farm comprising two or more wind turbines, the method comprising the steps of:
  determining a wake state of the wind energy farm, including determining wake chains defining wake relationships among the wind turbines of the wind farm under the current wind conditions,
  for at least one of the wind turbines of the wind energy farm, estimating a lifetime usage, based on an accumulated load measure for the wind turbine, and in the case that the estimated lifetime usage is below a predefined lifetime usage limit, operating the wind turbine in an overrated state,
  monitoring wake effects at each of the wind turbines,
  in the case that a downstream wind turbine detects wake effects above a predefined wake threshold level, generating a control signal for at least one wind turbine having an upstream wake relationship with the downstream wind turbine, the control signal requesting a decrease in generated wake, and
  controlling the wind turbines of the wind energy farm in accordance with the generated control signals.

Thus, the invention provides a method for controlling a wind energy farm. In the present context, the term 'wind energy farm' should be interpreted to mean a group of wind turbines arranged within a limited geographical area. The wind turbines of the wind energy farm may further share some infrastructure, such as roads, power grid connections, transformers, supply lines, communication lines, etc. Accordingly, the wind energy farm comprises two or more wind turbines.

In the method according to the invention, a wake state of the wind energy farm is initially determined. This includes determining wake chains defining wake relationships among the wind turbines of the wind energy farm under the current wind conditions. Thus, the wake state contains information regarding which of the wind turbines of the wind energy farm are currently arranged in the wake of which other wind turbines of the wind energy farm. For a given wind turbine the wake state will, thus, contain information regarding which of the other wind turbines create wake effects for the given wind turbine, as well as which other wind turbines are affected by the wake of the given wind turbine.

Furthermore, the wake state may contain information regarding to which extent the wind turbines of the wind energy farm are affected by wake from the other wind turbines of the wind energy farm.

In summary, the wake state information regarding wake effects affecting at least some of the wind turbines of the wind energy farm, under the current wind conditions, i.e. at the current wind direction, wind speed, turbulence level, wind shear, etc. The wake state may provide a complete picture of wake effects affecting each of the wind turbines of the wind energy farm, or it may provide this information for a subset of the wind turbines of the wind energy farm.

Next, a lifetime usage is estimated for at least one of the wind turbines of the wind energy farm. The estimated lifetime usage is based on an accumulated load measure for the wind turbine. In the present context the term 'lifetime usage' should be interpreted to mean a measure for the part of the design lifetime of the wind turbine which has already been used. As described above, wind turbines are normally designed with an expected lifetime, and during operation the wind turbine is controlled in accordance with design parameters, e.g. with respect to various loads on various components or parts of the wind turbines, which ensure that the wind turbine lasts throughout its expected lifetime, but preferably not more than that. If the wind turbine has, for a period of time, been operated with loads which are below the design loads, then the lifetime usage of the wind turbine during this time interval is less than the length of the time interval. Similarly, if the wind turbine has, for a period of time, been operated with loads which exceed the design loads, then the lifetime usage of the wind turbine during this time interval is more than the length of the time interval. Such deviations of the lifetime usage may be compensated by operating the wind turbine with higher or lower loads during a later time interval.

Accordingly, the estimated lifetime usage provides a measure for whether or not the wind turbine has so far been operated in a manner which allows a more aggressive control strategy for a period of time. Therefore, in the case that the estimated lifetime usage is below a predefined lifetime usage limit, the wind turbine is operated in an overrated state, i.e. in a state in which the power production of the wind turbine is higher than the nominal power. Accordingly, the total power production of the wind energy farm is increased, while it is ensured that the impact on the expected lifetime of the wind turbines of the wind energy farm is not affected.

A lifetime usage may be estimated for each of the wind turbines of the wind energy farm. Alternatively, a lifetime usage may only be estimated for some of the wind turbines, e.g. the ones which are most likely to be suitable for operating in an overrated state.

Then wake effects are monitored at each of the wind turbines, in order to ensure that none of the wind turbines of the wind energy farm are affected by the wake created by any of the other wind turbines of the wind energy farm, to an extent which may cause damage or fatigue, or which seriously limits the ability of the wind turbine to extract energy from the wind.

Thus, in the case that a downstream wind turbine detects wake effects above a predefined wake threshold level, a control signal is generated for at least one wind turbine having an upstream wake relationship with the downstream wind turbine, the control signal requesting a decrease in generated wake.

In the present context, the term 'downstream wind turbine' should be interpreted to mean a wind turbine which is arranged behind another wind turbine, along the direction of the incoming wind, and in the wake of the other wind turbine. Similarly, in the present context, the term 'upstream wind turbine' should be interpreted to mean a wind turbine which is arranged in front of another wind turbine, along the direction of the incoming wind, and which creates wake for the other wind turbine. Accordingly, downstream wind turbines are arranged in the wake of upstream wind turbines, and upstream wind turbines create wake effects for downstream wind turbines. Which wind turbines are to be considered as downstream wind turbines or upstream wind turbines with respect to each other is defined by the previously determined wake state of the wind energy farm, and depends on the current direction of the incoming wind.

It should be noted that a given wind turbine of the wind energy farm may very well be a downstream wind turbine with respect to one or more of the other wind turbines, as well as an upstream wind turbine with respect to one or more other wind turbines.

Thus, during operation of the wind energy farm, if one of the wind turbines detects that it is seriously affected by the combined wake created by wind turbines arranged upstream relative to the wind turbine, then at least one of these upstream wind turbines is requested to adjust its operation in such a manner that the wake created for the affected wind turbine is decreased, thereby reducing the undesired consequences at the affected wind turbine.

The predefined wake threshold level could, e.g., include a certain decrease in the energy of the wind reaching the downstream wind turbine, which prevents the wind turbine from producing nominal power. Alternatively or additionally it could include a turbulence level which causes loads on the downstream wind turbine above an acceptable level.

The method may include identifying each wind turbine of the wind energy farm having an upstream relationship with the downstream wind turbine. Alternatively, only some of the upstream wind turbines may be identified, e.g. the ones which are arranged closest to the downstream wind turbine and/or the ones which create the most serious wake effects.

Similarly, a control signal may be generated for each of the identified upstream wind turbines. Alternatively, a control signal may only be generated for some of the identified upstream wind turbines, e.g. the ones arranges closest to the downstream wind turbine and/or the ones which create the most serious wake effects.

Finally, the wind turbines of the wind energy farm are controlled in accordance with the generated control signals.

Thus, according to the method of the invention, the wind turbines of the wind energy farm are operated with as high a power production as possible, with due consideration to the expected lifetime of the wind turbines, and with due consideration to the wake effects thereby created for wind turbines arranged downstream. Accordingly, the total power production of the wind energy farm is maximised without affecting the expected lifetime of the wind turbines.

The step of monitoring wake effects at each of the wind turbines may comprise monitoring loads on one or more parts of the wind turbines. The parts of the wind turbines being monitored could, e.g., include wind turbine tower, foundation, wind turbine blades, drivetrain, main shaft, hub, pitch system and/or converter. The loads being monitored could, e.g., include loads due to bending moments, torsional loads, deflections, etc. The loads could be measured directly, or they could be estimated from measurements of other parameters, such as generator speed, rotor speed, power production, wind speed, turbulence, tower accelerations, pitch angle, etc.

The step of determining a wake state of the wind energy farm may comprise detecting wake effects at the wind turbines of the wind energy farm. This may, e.g., be done in the manner described above. According to this embodiment, determining whether or not a given wind turbine is arranged in the wake of one or more other wind turbines is not based solely on wake models, site design, wind direction, wind speed, etc. Instead, for each wind turbine it is measured whether or not that wind turbine actually is affected by wake effects. This provides a more accurate picture of the wake state of the wind energy farm.

The step of estimating a lifetime usage for a given wind turbine may comprise the steps of:
 measuring or estimating a bending moment of the wind turbine,
 calculating a fatigue load on the wind turbine, based on the measured or estimated bending moment, and
 comparing the calculated fatigue load to an expected fatigue load on the wind turbine, based on the age of the wind turbine.

According to this embodiment, the estimated lifetime usage of a given wind turbine is based on a fatigue load applied to the wind turbine, due to a bending moment acting on a part of the wind turbine. Fatigue loads are long time consequences of the operation of the wind turbine. If the accumulated fatigue loads exceed a design accumulated fatigue load, this will affect the expected lifetime of the wind turbine. Therefore, fatigue loads are a suitable measure for the lifetime usage of the wind turbine.

The bending moment may be a tower bottom bending moment. Alternatively, the bending moment may be a bending moment introduced in another part of the wind turbines, such as the main shaft, the wind turbine blades, the hub, etc.

The step of calculating a fatigue load on the wind turbine may be performed using a rainflow count. The rainflow counting algorithm is often used in the analysis of fatigue data in order to reduce a spectrum of varying stress into as set of simple stress reversals. It is suitable for assessing the fatigue life of a structure subject to complex loading. Thus, a rainflow count is very suitable for calculating the fatigue load on the wind turbine.

As an alternative, the step of estimating a lifetime usage for a given wind turbine may be performed in the following manner. A torque of the wind turbine, e.g. a gear torque or a generator torque, may be monitored, and a load duration distribution may be calculated based thereon. This may, e.g., include making a Markov matrix showing the load levels over time, weighing the Markov matrix with a Wöhler coefficient and summing up the result. The summed result may be compared to an expected torque load duration distribution as a function of lifetime. If the summed result is below the expected torque load duration distribution, then it can be assumed that the wind turbine can be operated with a higher torque without affecting the expected lifetime of the wind turbine. Similarly, if the summed result is above the expected torque load duration distribution, then the wind turbine must be operated with a lower torque in order to avoid affecting the expected lifetime of the wind turbine.

The method may further comprise the step of, in the case that a wind turbine is operated in an overrated state, re-estimating the lifetime usage, and in the case that the estimated lifetime usage reaches the predefined lifetime usage limit, discontinuing operating the wind turbine in the overrated state.

According to this embodiment, it is repeatedly evaluated whether or not it is still suitable to operate the wind turbines in the overrated state. Thereby it is ensured that a wind turbine is only operated in the overrated state as long as this is not expected to reduce the expected lifetime of the wind turbine, and it is ensured that none of the wind turbines are subjected to loads which will reduce their expected lifetime.

The step of generating a control signal for at least one wind turbine having an upstream wake relationship with the downstream wind turbine may comprise the steps of:
the downstream wind turbine forwarding a wake detected signal to a central wind energy farm controller, the wake detected signal indicating that the downstream wind turbine has detected wake effects above a predefined wake threshold level,
in response to receiving the wake detected signal, the central wind energy farm controller identifying at least one wind turbine of the wind energy farm having an upstream wake relationship with the downstream wind turbine, based on the determined wake state of the wind energy farm, and
the central wind energy farm controller generating a control signal for at least one of the identified wind turbine(s) and forwarding the generated control signals to the identified wind turbine(s).

According to this embodiment, a central wind energy farm controller handles the overall control of the wind energy farm. This includes generating the control signals for the upstream wind turbines, requesting a reduction in the generated wake, in response to a wake detected signal from one of the wind turbines of the wind energy farm. The central wind energy farm controller may further have access to the wake state of the wind energy farm, and thereby to information regarding which of the wind turbines are generating wake for the downstream wind turbine which has forwarded the wake detected signal. This allows the central wind energy farm controller to identify the wind turbines which are creating wake for the downstream wind turbine, and which should therefore receive a control signal requesting a reduction in generated wake.

As described above, the central wind energy farm controller may identify all wind turbines having an upstream relationship with the downstream wind turbine, or it may identify a subset of the upstream wind turbines. Similarly, the central wind energy farm controller may generate a control signal for each of the identified upstream wind turbines, or only for a subset of the identified upstream wind turbines.

As an alternative, the control signals may be generated by a local controller of the downstream wind turbine and forwarded directly from the downstream wind turbine to each of the wind turbines having an upstream wake relationship with the downstream wind turbine.

At least one of the generated control signals may request a decrease in power production of the upstream wind turbine. According to this embodiment, the wake generated by the upstream wind turbines is decreased by decreasing the power production of at least one of the upstream wind turbines. This could, e.g., include derating the wind turbine or discontinuing operating the wind turbine in an overrated state.

The method may further comprise the step of identifying at least one wind turbine which does not have an upstream wake relationship with any of the other wind turbines of the wind energy farm, and the step of estimating a lifetime usage for at least one of the wind turbines of the wind energy farm may include estimating a lifetime usage for the at least one identified wind turbine.

According to this embodiment, one or more wind turbines which do not have an upstream wake relationship with any of the other wind turbines of the wind energy farm are identified. These wind turbines may be referred to as 'leaf nodes' of the wake chains. Such wind turbines are not creating wake for any other wind turbines, and therefore operating these wind turbines in an overrated state is not expected to have an adverse effect on any of the other wind turbines of the wind energy farm. Accordingly, as long as the estimated lifetime usage of such a wind turbine is below the predefined lifetime usage limit, it should be safe to operate the wind turbine in an overrated state. It is therefore advantageous to initially select these wind turbines for overrated operation, and subsequently investigate whether or not any of the other wind turbines, which are arranged further up in the wake chains, could be operated in an overrated state. This could, e.g., be done be removing the leaf nodes from the wake chains, thereby leaving the wind turbines which only have an upstream wake relationship with to the removed leaf nodes as the new leaf nodes of the wake chains, and these wind turbines could be identified as the next candidates for operating in an overrated state. The steps described above could then be repeated for these new leaf nodes. Furthermore, this process could be repeated until the roots of the wake chains, i.e. the wind turbines which do not have a downstream wake relationship with any other wind turbine, are reached.

BRIEF DESCRIPTION OF THE DRAWINGS

The invention will now be described in further detail with reference to the accompanying drawings in which.

DETAILED DESCRIPTION OF THE DRAWINGS

Figure 1:
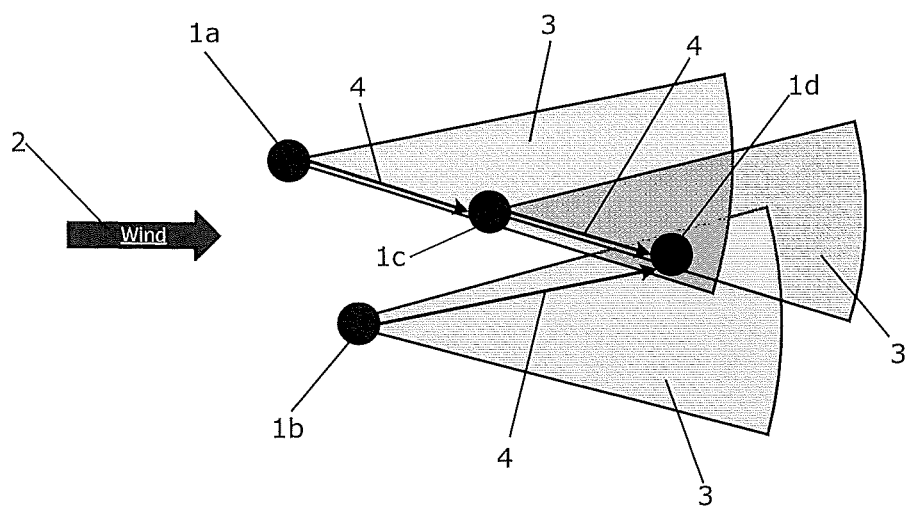
FIGS. 1-3 illustrate wake chains in a wind energy farm being controlled in accordance with a method according to an embodiment of the invention.
Figure 2:
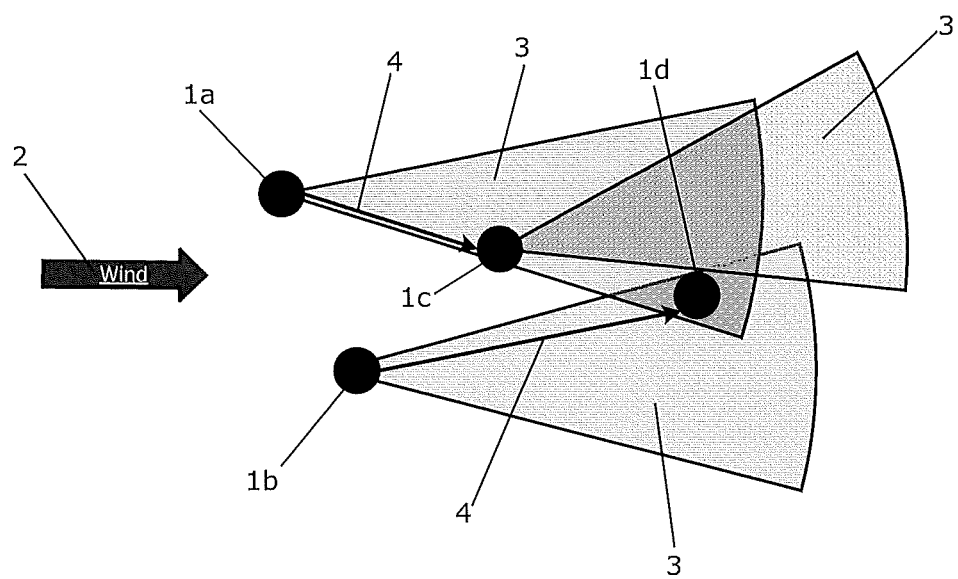
Figure 3:
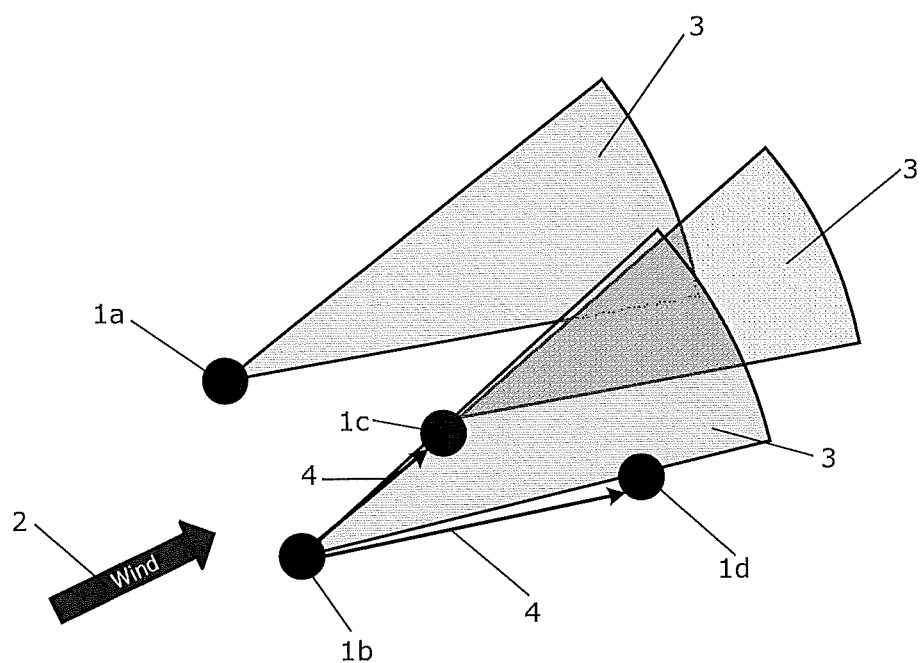

FIGS. 1-3 illustrate four wind turbines 1a, 1b, 1c, 1d arranged in a wind energy farm being controlled in accordance with a method according to an embodiment of the invention. FIGS. 1-3 illustrate wake chains of the wind turbines 1a, 1b, 1c, 1d under various operating conditions.

The direction of the incoming wind is illustrated by arrow 2, and the wake generated by the respective wind turbines 1a, 1b, 1c, 1d is illustrated by cones 3 connected to the respective wind turbines 1a, 1b, 1c, 1d.

In the situation illustrated in FIG. 1, all of the wind turbines 1a, 1b, 1c, 1d are properly yawed into the incoming wind 2, i.e. the rotor of each wind turbine 1a, 1b, 1c, 1d is directly facing the incoming wind 2. Accordingly, the cones 3 illustrating the wake generated by the wind turbines 1a, 1b, 1c, 1d are pointing substantially in the same direction as the incoming wind 2.

When one wind turbine 1a, 1b, 1c, 1d is arranged in the wake created by one of the other wind turbines 1a, 1b, 1c, 1d, a wake relationship exists among the two wind turbines 1a, 1b, 1c, 1d. In the situation illustrated in FIG. 1, wind turbine 1d is arranged in the wake of wind turbines 1a, 1b and 1c. Thus, wind turbine 1d may be regarded as a downstream wind turbine with respect to each of wind turbines 1a, 1b and 1c, and each of wind turbines 1a, 1b and 1c may be regarded as upstream wind turbines with respect to wind turbine 1d. No wind turbine is arranged in the wake of wind turbine 1d, and therefore wind turbine 1d is not an upstream wind turbine with respect to one or more other wind turbines when the wind direction is as shown in FIG. 1.

Similarly, wind turbine 1c is arranged in the wake of wind turbine 1a. Accordingly, wind turbine 1c may be regarded as a downstream wind turbine with respect to wind turbine 1a, and wind turbine 1a may be regarded as an upstream wind turbine with respect to wind turbine 1c. And, as described above, wind turbine 1c may also be regarded as an upstream wind turbine with respect to wind turbine 1d.

Wind turbines 1a and 1b are not arranged in the wake of any other wind turbine. Accordingly, wind turbines 1a and 1b are not downstream wind turbines with respect to one or more other wind turbines. However, wind turbine 1d is arranged in the wake of wind turbine 1b, and wind turbines 1c and 1d are both arranged in the wake of wind turbine 1a. Accordingly, as described above, wind turbine 1b may be regarded as an upstream wind turbine with respect to wind turbine 1d, and wind turbine 1a may be regarded as an upstream wind turbine with respect to each of wind turbines 1c and 1d.

The wake relationships described above are illustrated by arrows 4, indicating which of the wind turbines 1a, 1b, 1c, 1d are affected by wake effects generated by which other wind turbines 1a, 1b, 1c, 1d. The arrows 4 may be referred to as wake chains.

In the situation illustrated in FIG. 2, the wind direction 2 is substantially the same as in the situation illustrated in FIG. 1. However, in the situation illustrated in FIG. 2, a yaw error is present in wind turbine 1c, i.e. the rotor of wind turbine 1c is not pointing directly into the incoming wind 2. As a consequence, the cone 3 illustrating the wake created by wind turbine 1c is not pointing in the same direction as the incoming wind 2. Thereby wind turbine 1d is no longer arranged in the wake of wind turbine 1c. The wake relationships of the wind turbines 1a, 1b, 1c, 1d in FIG. 2 are thereby as follows. Wind turbine 1d is a downstream wind turbine with respect to wind turbines 1a and 1b, and is not an upstream wind turbine with respect to any other wind turbine. Wind turbine 1c is a downstream wind turbine with respect to wind turbine 1a, and is not an upstream wind turbine with respect to any other wind turbine. Wind turbine 1b is an upstream wind turbine with respect to wind turbine 1d, and is not a downstream wind turbine with respect to any other wind turbine. Finally, wind turbine 1a is an upstream wind turbine with respect to wind turbines 1c and 1d, and is not a downstream wind turbine with respect to any other wind turbine.

In the situation illustrated in FIG. 3, the direction of the incoming wind 2 has changed as compared to the situation illustrated in FIG. 1. All of the wind turbines 1a, 1b, 1c, 1d are properly yawed into the incoming wind 2, i.e. the rotor of each wind turbine 1a, 1b, 1c, 1d is directly facing the incoming wind 2.

As a consequence of the changed direction of the incoming wind 2, the directions of the cones 3 illustrating the wake generated by the wind turbines 1a, 1b, 1c, 1d have also been changed. Thereby the wake relationships of the wind turbines 1a, 1b, 1c, 1d in FIG. 3 are as follows. Wind turbine 1d is a downstream wind turbine with respect to wind turbine 1b, and is not an upstream wind turbine with respect to any other wind turbine. Wind turbine 1c is a downstream wind turbine with respect to wind turbine 1b, and is not an upstream wind turbine with respect to any other wind turbine. Wind turbine 1b is an upstream wind turbine with respect to wind turbines 1c and 1d, and is not a downstream wind turbine with respect to any other wind turbine. Finally, wind turbine 1a is neither a downstream wind turbine nor an upstream wind turbine with respect to any other wind turbine.

The wake chains illustrated in FIGS. 1-3 are, thus, defined by the current wind conditions, including the current wind direction 2. Furthermore, the current wind speed, and possibly the prevailing turbulence conditions, will have an influence on the lengths of the cones 3, and will thereby have an impact on the wake chains.

The wake chains may be obtained by detecting wake effects at each of the wind turbines 1a, 1b, 1c, 1d. This could, e.g., include monitoring loads on one or more parts of the wind turbines 1a, 1b, 1c, 1d which are characteristic for specific wake effects, such as increased turbulence, occurring at the position of the wind turbine 1a, 1b, 1c, 1d.

Figure 4:
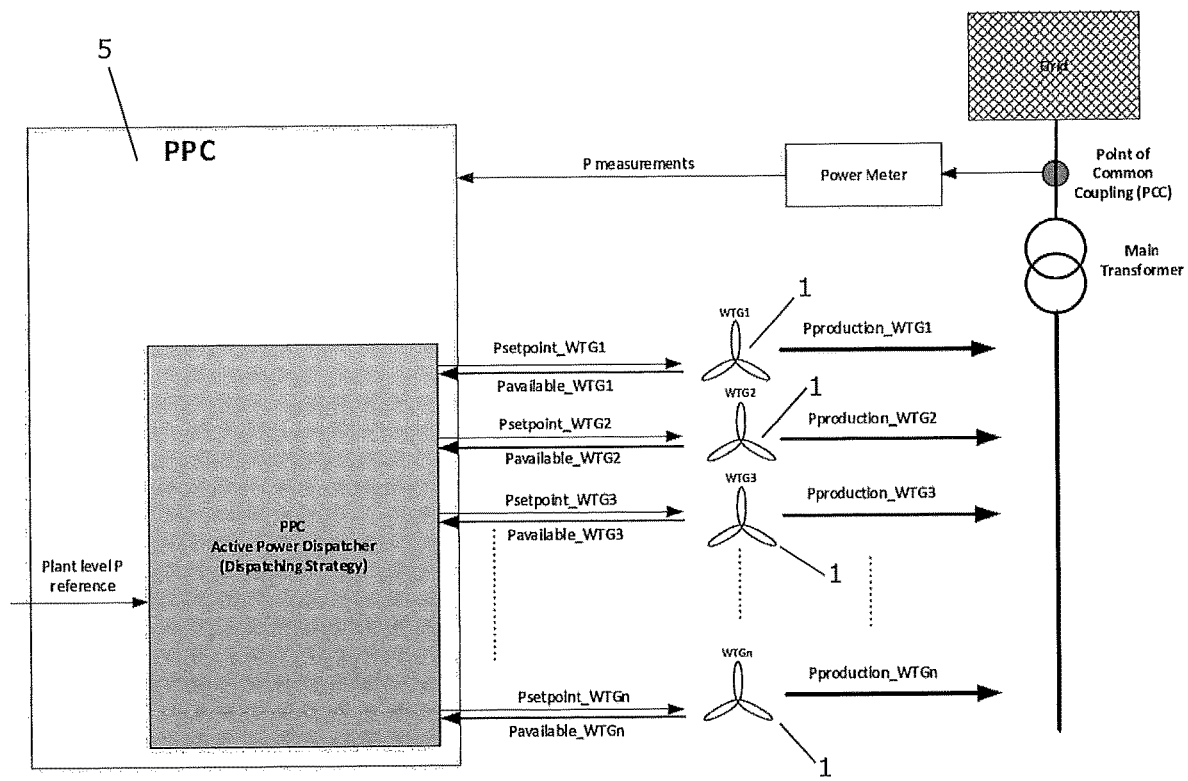
FIG. 4 is a block diagram illustrating a method according to an embodiment of the invention.

FIG. 4 is a block diagram illustrating control of a wind energy farm in accordance with a method according to an embodiment of the invention. The wind energy farm comprises a number of wind turbines 1, four of which are illustrated. The wind energy farm further comprises a central wind energy farm controller 5 arranged to handle the overall control of the wind energy farm, including coordination of the control of the individual wind turbines 1 of the wind energy farm. Accordingly, each of the wind turbines 1 of the wind energy farm is arranged to communicate with the central wind energy farm controller 5.

In the method illustrated in FIG. 4, when one of the wind turbines 1 of the wind energy farm detects wake effects above a predefined threshold, it forwards a wake detected signal to the central wind energy farm controller 5. The detected wake effects could, e.g., be in the form of a detection of specific loads on one or more parts of the wind turbine 1, the loads being characteristic for undesired wake effects occurring at the wind turbine 1. Alternatively or additionally, the detected wake effects could include detecting a certain turbulence pattern at the wind turbine 1.

In response to the receipt of a wake detected signal from a wind turbine 1, the central power plant controller 5 identifies at least one wind turbine 1 of the wind energy farm which has an upstream wake relationship with the wind turbine 1 which forwarded the wake detected signal. Accordingly, at least some of the wind turbines 1 which contribute to the wake occurring at the wind turbine 1 which forwarded the wake detected signal are identified. This identification could, e.g., be performed using previously determined wake chains of the kind illustrated in FIGS. 1-3. All wind turbines 1 which contribute to the wake may be identified, or only some of these wind turbines 1 may be identified, e.g. the ones providing the largest contributions.

Then the central wind energy farm controller 5 generates a control signal for at least one of the identified upstream wind turbines 1 and forwards the generated control signals to the respective upstream wind turbines 1. The control signals request the upstream wind turbines 1 to decrease the generated wake. This could, e.g., include decreasing the power production of the wind turbines 1. Control signals may be generated for all of the identified upstream wind turbines 1, or only for some of the identified upstream wind turbines 1, e.g. the ones providing the largest contributions to the wake effects.

Furthermore, the central wind energy farm controller 5 may request one or more of the wind turbines 1 of the wind energy farm to operate in an overrated state if it can be assumed that this will not decrease the expected lifetime of the wind turbines 1. To this end the lifetime usage for the wind turbines 1 is estimated, based on an accumulated load measure for the wind turbines 1. If the estimated lifetime usage for a given wind turbine 1 is below a predefined lifetime usage limit, it is considered safe to operate the wind turbine 1 in an overrated state, and the central wind energy farm controller 5 therefore forwards a control signal to the wind turbine 1, requesting it to operate in an overrated state. However, if a downstream wind turbine 1 subsequently detects that this results in wake effects above a predefined wake threshold level, then the wind energy farm controller 5 may request the upstream wind turbine 1 to stop operating in an overrated state.

Figure 5:
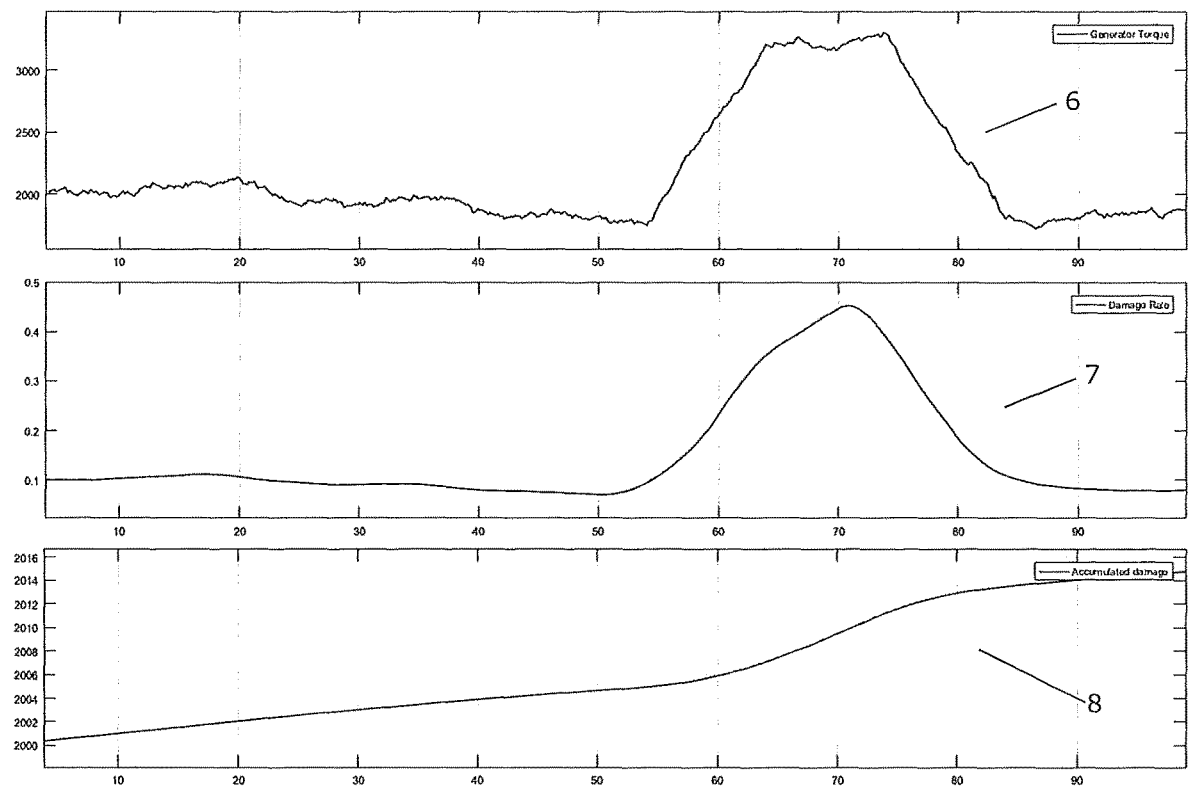
FIG. 5 illustrates determination of lifetime usage for use in a method according to an embodiment of the invention.

FIG. 5 shows three curves, illustrating determination of lifetime usage for use in a method according to an embodiment of the invention. The upper curve 6 shows measured generator torque of a wind turbine as a function of time. The middle curve 7 shows an estimated damage rate on the generator of a wind turbine, caused by the generator torque, as a function of time. The lower curve 8 shows accumulated damage on the generator as a function of time.

It can be seen from the upper curve 6 that the generator torque is substantially constant for most of the time. However, an increase in generator torque appears during a time period from approximately t=54 to approximately t=85. This could, e.g., be due to the wind turbine being operated in an overrated state, or due to the wind turbine being arranged in the wake of one or more other wind turbines.

It can be seen from the middle curve 7 that the increase in generator torque results in a corresponding increase in the estimated damage rate on the generator.

It can be seen from the lower curve 8 that the accumulated damage on the generator increases steadily for most of the time. However, during the time interval where the generator torque is increased, the accumulated damage on the generator increases faster, reflecting the increased estimated damage rate illustrated in the middle curve 7.

The accumulated damage on the generator illustrated in the lower curve 8 may be used for estimating a lifetime usage for the wind turbine. In order to ensure that the wind turbine is able to operate during an entire design lifetime of the wind turbine without introducing excessive fatigue loads, the accumulated damage should be maintained below a level corresponding to an expected accumulated damage at any given time during the lifetime of the wind turbine. If the wind turbine has, for a period of time, been operated with a damage rate which is below a design damage rate, the wind turbine can subsequently be operated at a higher damage rate for a limited time period, without causing the accumulated damage to exceed the design accumulated damage at that point in time. Thus, when this is the case, the wind turbine may, e.g., be allowed to operate in an overrated state. Furthermore, an increased damage rate may be allowed under certain wind conditions or if the wind turbine can subsequently be operated in a less aggressive manner.

Figure 6:
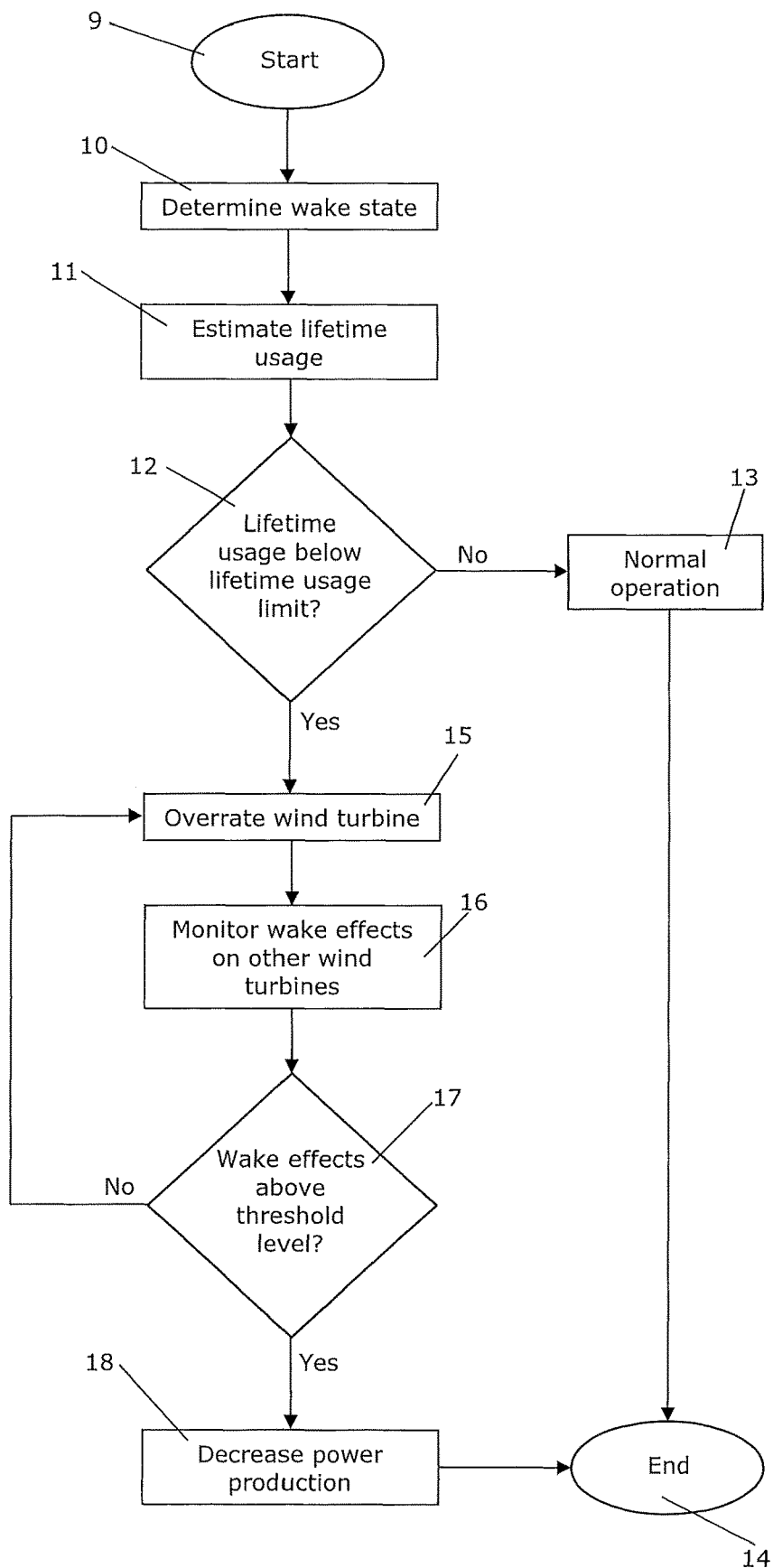
FIG. 6 is a flow chart illustrating a method according to an embodiment of the invention.

FIG. 6 is a flow chart illustrating a method according to an embodiment of the invention. The process is started at step 9. At step 10 a wake state for the wind energy farm is determined. This could, e.g., be done in the manner described above with reference to FIGS. 1-3.

At step 11, a lifetime usage for one of the wind turbines of the wind energy farm is determined. This could, e.g., be done in the manner described above with reference to FIG. 5.

At step 12 it is investigated whether or not the estimated lifetime usage is below a predefined lifetime usage limit. If this is not the case, operation of the wind turbine in an overrated state will most likely decrease the expected lifetime of the wind turbine. Therefore, in this case, the process is forwarded to step 13, and the wind turbine is operated in a normal manner, and the process is ended at step 14.

In the case that step 12 reveals that the estimated lifetime usage is below the predefined lifetime usage limit, it is considered safe to operate the wind turbine in an overrated state, in the sense that this is not expected to cause a significant decrease in the expected lifetime of the wind turbine. Therefore, in this case, the process is forwarded to step 15, and the wind turbine is operated in an overrated state, thereby increasing the total power output of the wind energy farm.

While the wind turbine is operated in the overrated state, wake effects are monitored at the wind turbines arranged downstream with respect to the wind turbine, at step 16. This could, e.g., include monitoring various loads on the downstream wind turbines.

At step 17 it is investigated whether or not one or more of the downstream wind turbines has detected wake effects above a predefined wake threshold level. If this is not the case, it is considered safe to continue operating the wind turbine in the overrated state, and the process is therefore returned to step 15.

In the case that step 17 reveals that one or more of the downstream wind turbines has detected wake effects above the predefined wake threshold level, it is no longer considered safe to operate the wind turbine in the overrated state.

Therefore the process is, in this case, forwarded to step 18, where the power production of the wind turbine is decreased, e.g. to the nominal power production level, and the process is ended at step 14.

Steps 11-18 may be repeated or performed simultaneously for one or more further wind turbines of the wind turbines of the wind energy farm, e.g. for each of the wind turbines of the wind energy farm.

The invention claimed is:

1. A method for controlling a wind energy farm, the wind energy farm comprising a plurality of wind turbines, the method comprising:
   determining a wake state of the wind energy farm, including determining wake chains defining wake relationships among the plurality of wind turbines of the wind energy farm under current wind conditions, wherein a first wind turbine of the plurality of wind turbines comprises at least one downstream wind turbine in a first wake chain, and wherein a second wind turbine is a leaf node in a second wake chain,
   for at least the first wind turbine of the wind energy farm, estimating a first lifetime usage, based on an accumulated load measure for the first wind turbine, and in a case that the first estimated lifetime usage is below a first predefined lifetime usage limit, operating the first wind turbine in a first overrated state,
   estimating a second lifetime usage, based on an accumulated load measure for the second wind turbine, and in a case that the second estimated lifetime usage is below a second predefined lifetime usage limit, operating the second wind turbine in a second overrated state,
   at a first time and upon operating the first wind turbine operating in the first overrated state, monitoring wake effects due to at least the first wind turbine operating in the first overrated state at each of the wind turbines of the wind energy farm,
   in a case that a downstream wind turbine detects wake effects above a predefined wake threshold level, generating a control signal for the first wind turbine operating in the first overrated state, wherein the control signal requests a decrease in generated wake from the first wind turbine, and wherein the first wind turbine operating in the first overrated state comprises an upstream wake relationship with the downstream wind turbine,
   at a second time, controlling the first wind turbine operating in the first overrated state in accordance with the generated control signal, and
   operating the second wind turbine in accordance with the second overrated state.

2. The method of claim 1, wherein the monitoring wake effects at each of the wind turbines comprises monitoring loads on one or more parts of the plurality of wind turbines.

3. The method of claim 1, wherein the determining a wake state of the wind energy farm comprises detecting wake effects at the plurality of wind turbines of the wind energy farm.

4. The method of claim 1, wherein the estimating a lifetime usage for a given wind turbine comprises:
   measuring or estimating a bending moment of the wind turbine,
   calculating a fatigue load on the wind turbine, based on the measured or estimated bending moment, and
   comparing the calculated fatigue load to an expected fatigue load on the wind turbine, based on an age of the wind turbine.

5. The method of claim 4, wherein the bending moment is a tower bottom bending moment.

6. The method of claim 4, wherein the calculating a fatigue load on the wind turbine is performed using a rainflow count.

7. The method of claim 1, further comprising, in the case that a wind turbine is operated in an overrated state, re-estimating the first estimated lifetime usage, and in the case that the estimated lifetime usage reaches the predefined lifetime usage limit, discontinuing operating the wind turbine in the overrated state.

8. The method of claim 1, wherein the generating the control signal further comprises:
   the downstream wind turbine forwarding a wake detected signal to a central wind energy farm controller, the wake detected signal indicating that the downstream wind turbine has detected wake effects above a predefined wake threshold level,
   in response to receiving the wake detected signal, the central wind energy farm controller identifying at least one wind turbine of the wind energy farm having an upstream wake relationship with the downstream wind turbine, based on the determined wake state of the wind energy farm, and
   the central wind energy farm controller generating a control signal for at least one of the identified wind turbine(s) and forwarding the generated control signals to the identified wind turbine(s).

9. The method of claim 8, wherein at least one of the generated control signals request a decrease in power production of an upstream wind turbine.

10. The method of claim 1, further comprising identifying at least one wind turbine which does not have an upstream wake relationship with any of the other wind turbines of the wind energy farm, and wherein the estimating a lifetime usage for at least one of the wind turbines of the wind energy farm includes estimating a lifetime usage for the at least one identified wind turbine.

11. A wind energy farm, comprising:
   a plurality of wind turbines; and
   a control system configured to control the plurality of wind turbines by performing an operation, comprising:
   determining a wake state of the wind energy farm, including determining wake chains defining wake relationships among the plurality of wind turbines under current wind conditions,
   for at least a first wind turbine of the plurality of wind turbines, estimating a first lifetime usage, based on an accumulated load measure for the first wind turbine, and in a case that the first estimated lifetime usage is below a first predefined lifetime usage limit, operating the first wind turbine in a first overrated state,
   estimating a second lifetime usage, based on an accumulated load measure for a second wind turbine of the plurality of wind turbines, and in a case that the second estimated lifetime usage is below a second predefined lifetime usage limit, operating the second wind turbine in a second overrated state, at a first time and upon operating the first wind turbine operating in the first overrated state, monitoring wake effects at each of the plurality of wind turbines due to at least the first wind turbine operating in the first overrated state,
   upon a downstream wind turbine detecting wake effects above a predefined wake threshold level, generating a control signal for the first wind turbine operating in the first overrated state, the control signal requesting a decrease in generated wake from the first wind turbine, wherein the first wind turbine operating in the first overrated state comprises an upstream wake relationship with the downstream wind turbine, at a second time, controlling the first wind turbine operating in the first overrated state in accordance with the generated control signal, and operating the second wind turbine in accordance with the second overrated state.

12. The wind energy farm of claim 11, wherein the monitoring wake effects at each of the plurality of wind turbines comprises monitoring loads on one or more parts of the plurality of wind turbines.

13. The wind energy farm of claim 11, wherein the determining a wake state of the wind energy farm comprises detecting wake effects at the plurality of wind turbines.

14. The wind energy farm of claim 11, wherein the estimating a lifetime usage for a given wind turbine comprises:

determining a bending moment of the wind turbine, calculating a fatigue load on the wind turbine, based on the determined bending moment, and comparing the calculated fatigue load to an expected fatigue load on the wind turbine, based on an age of the wind turbine.

15. The wind energy farm of claim 14, wherein the bending moment is a tower bottom bending moment.

16. The wind energy farm of claim 14, wherein the calculating a fatigue load on the wind turbine is performed using a rainflow count.

17. The wind energy farm of claim 11, further comprising:

upon operating in an overrated state, re-estimating the first estimatd lifetime usage; and upon the re-estimated lifetime usage reaching the first predefined lifetime usage limit, discontinuing operating the first wind turbine in the overrated state.

* * * * *